United States Patent [19]
Ohbayashi et al.

[11] Patent Number: 5,863,702
[45] Date of Patent: Jan. 26, 1999

[54] OPTICAL RECORDING MEDIA

[75] Inventors: Gentaro Ohbayashi; Hitoshi Nobumasa; Kunihisa Nagino; Kusato Hirota; Takao Amioka, all of Shiga-ken, Japan

[73] Assignee: Toray Industries, Inc., Tokyo, Japan

[21] Appl. No.: 623,553

[22] Filed: Mar. 28, 1996

[30] Foreign Application Priority Data

Mar. 28, 1995 [JP] Japan ................................. 7-069954
Aug. 23, 1995 [JP] Japan ................................. 7-214784
Dec. 28, 1995 [JP] Japan ................................. 7-344200

[51] Int. Cl.$^6$ ..................................................... G11B 7/24
[52] U.S. Cl. ................ 430/270.13; 430/945; 369/275.2; 369/275.4; 369/284
[58] Field of Search .............................. 430/270.13, 945; 369/284, 275.2, 275.4

[56] References Cited

U.S. PATENT DOCUMENTS 5,273,861 12/1993 Yamada et al. ..................... 430/270.13
5,424,106 6/1995 Yamada et al. ..................... 430/270.13
5,527,661 6/1996 Akahira et al. ..................... 430/270.13

FOREIGN PATENT DOCUMENTS 7-311980 11/1995 Japan .

Primary Examiner—John A. McPherson
Attorney, Agent, or Firm—Morrison & Foerster LLP

[57] ABSTRACT

An optical recording medium having each of a land and a groove and comprises at least a recording layer, dielectric layers and reflection layer. Recording and erasing of data can be carried out on both land and groove by a phase change between amorphous and crystalline states. The mirror portion may have reflectance characteristics selected from at least one of a reflectance of more than 15% and no more than 35%, when in a crystalline state, and 10% or less, when in an amorphous state. Alternatively, additionally, the depth of the groove may be such as form an optical path length equal to $\frac{1}{7}$ to $\frac{1}{5}$ of the wavelength of the reproducing light and the photo-absorbance of the recording layer in the amorphous phase and the photo-absorbance in the crystalline phase may satisfy the following formula, $$Aa-Ac \leq 10$$

where Aa is the photo-absorbance (%) of the recording layer in the amorphous phase and Ac is the photo-absorbance (%) of the recording layer in the crystalline phase. In an optical recording method, an edge type recording system is provided on an optical recording medium in which recording and erasing are effected by a phase change between amorphous and crystalline states. Recorded marks are provided by pulse trains each comprising a number of recording power pulses and, additionally, a power pulse, after the last of the recording power pulses, of a power less than a erase power and of a duration in a range 1.1 to 6, times the duration of the last recording power pulse.

31 Claims, No Drawings

OPTICAL RECORDING MEDIA

FIELD OF THE INVENTION

The present invention relates to an optical information recording medium, which allows information to be recorded, erased and reproduced by irradiation with light and also to a method for recording on an optical information recording medium. More particularly, the present invention relates to a rewritable phase change type recording medium such as an optical disc, optical card, or optical tape, which allows recorded information to be erased or rewritten and allows information signals to be recorded at a high speed and at a high density and also to a method for recording on said recording medium.

BACKGROUND OF THE INVENTION

The conventional techniques of the rewritable phase change type optical recording media and of the methods of recording on such recording media are described below.

These optical recording media have a recording layer mainly composed of an alloy of Te, Ge and Sb, etc. For recording, the recording layer is irradiated with focused laser beam pulses for a short time, to partially melt the recording layer. The molten portion is quickly cooled by thermal diffusion and solidified, to form recorded marks of the amorphous state. The light reflectance of the recorded marks is lower than that of the crystalline state and the recorded marks can be optically reproduced as recorded signals.

Furthermore, for erasure, the portion of the recorded marks is irradiated with a laser beam, to be heated at a temperature lower than the melting point of the recording layer and higher than the crystallization temperature, to crystallize the recorded marks of the amorphous state, for returning them into the original unrecorded state.

In the optical recording media with a Te alloy as the recording layer, the crystallization rate is high and high speed overwriting by a circular beam can be achieved by simply modulating the irradiation power into a recording power for writing the marks and an erasing power for erasing the recorded marks (T. Ohta et al, Proc. Int. Symp. on Optical Memory, 1989, p.49–50). These optical recording media with a recording layer usually have a heat-resistant and transparent dielectric layer each on both sides of the recording layer, to prevent the recording layer from being deformed or opened during recording. Furthermore, in another technique known, a reflection layer of a light-reflecting metal such as Al is provided on the side opposite to the beam incident side, to improve the signal contrast at the time of reproduction by optical interference effect and to allow easy formation of recorded marks of amorphous state by the effect of cooling the recording layer and also to improve erasabilities and overwrite cycles.

Especially the "rapid cooling structure", in which the recording layer and the dielectric layer between the recording layer and the reflection layer are kept as thin as about 20 nm, is considerably less lowered in recordability in spite of repeated overwriting and wider in the erasing power margin than the "slow cooling structure" in which the dielectric layer is as thick as about 200 nm. These rewritable phase change type optical recording media include optical discs. On the substrate of the optical disc, a groove is formed beforehand to form also land. At present, a general optical disc has a laser beam focused only on either the land or the groove, for recording and reproducing signals.

To increase the recording capacity of the optical disc, it is practiced to narrow the width of the land or groove, for shortening the track pitch. However, if the track pitch are shortened, the groove makes the angle of diffraction of reflected light large, to lower disadvantageously the tracking error signal for enabling the focused spot accurately to follow the track. Furthermore, if the width of the land or groove is narrowed, the width of the recorded pits is also narrowed, to lower the amplitude of reproduced signals as another problem. On the other hand, a technique of recording signals on both the tracks of the land and groove for increasing the recording capacity (JP-B 88-57859) is also known. However, if signals are recorded on both the tracks of the land and the groove, there are such problems (i) that the signal leak from the adjacent track (cross talk) increases, so that regenerated signals deteriorate, thus increasing the error, (ii) that since the difference in the amplitude of reproduced signals between the land and the groove becomes large, data detection is difficult and (iii) that at the time of recording, the marks of the adjacent track already recorded are erased (cross erase).

For such an optical disc, pit position recording has been used. However, in recent years, to meet the demand for higher density recording media, edge recording to allow higher density recording by recording information at edges of marks is going to be used instead of the pit position recording.

In edge recording, longer recorded marks must be formed than those of the pit position recording and at the rear portion of a long mark, the remaining heat effect of the recording layer widens the recorded mark, to deform disadvantageously the front-rear symmetry of the recorded mark like a tear drop. The deformation of the recorded mark deforms the reproduced signal, to increase jitter as a result.

As a means for solving this problem, it has been proposed to divide one recording pulse into a plurality of recording pulses (hereinafter called a pulse train) (JP-A 91-35425). Furthermore, a technique, in which a pulse corresponding to one half of the window margin and with a power smaller than the erasing power is applied for irradiation after the last pulse of each recording pulse train, is known (Proceedings of 5th Symposium on the Research of Phase Change Recording, p. 86, 1993).

However, in general, in a phase change type optical recording medium, the recorded marks of amorphous state are lower in reflectance and the difference in reflectance between the recorded amorphous state and the non-recorded crystalline state makes the difference in the photo-absorbed quantity of the recording layer large. So, depending on whether the state before overwriting is the crystalline state or the amorphous state with marks, the temperature rise during recording is different. Even in the edge recording using pulse trains, this phenomenon is liable to occur at the rear end of a long recorded mark since the temperature reached during recording is higher and it remarkably appears at a higher recording linear velosity. Thus, depending on the state before overwriting, the maximum temperature at the overwriting changes and the cooling rate of the recording layer also changes. So, a new recorded mark is modulated by the previous recorded mark, which is a factor to limit the jitter characteristic at the rear end of the mark and furthermore to limit erasability. That is, even if pulse trains are used, the deformation of recorded marks at the time of overwriting cannot be avoided.

Moreover, even if a pulse with a duration corresponding one half of the window margin and with a power smaller than the erasing power is added after the last pulse, the jitter characteristic at the rear end of the recorded mark at the time of overwriting cannot be sufficiently improved.

SUMMARY OF THE INVENTION

The present invention assreses the problems associated with the conventional optical recording media and to provide an optical recording medium which can decrease the cross talk without widening the track pitch more than the track pitches of the conventional optical recording media and without using any special optical system or signal processing circuit for decreasing the cross talk, can keep the reproduced signal amplitudes of the land and the groove almost equal and can also decrease the cross erasure.

The present invention seeks also to provide an optical recording medium high in recording sensitivity and excellent in such recording characteristics as carrier-to-noise ratio and erasability.

The present invention seeks also to provide an edge recording method excellent in jitter characteristic without deformation at the rear ends of marks.

Furthermore, the present invention seeks also addresses the problems associated with conventional optical recording media, for realizing an optical disc high in density and large in capacity and seeks to provide an optical recording medium for the edge recording on both the tracks of the land and the groove, which is less in cross talk, can keep the regenerated signal amplitudes of the land and the groove almost equal and can suppress the jitter increase at the time of overwriting.

The present invention provides an optical recording medium excellent in oxidation resistance and wet heat resistance and long in lifetime without causing any defect even after storage for a long time.

The present invention provides, according to the first aspect, an optical recording medium having each of a land and a groove, on each of which land and groove recording and erasing of data is to be carried out by phase change between amorphous and crystalline, and which optical recording medium comprises at least a recording-layer, dielectric layer and reflecting layer, characterized in that the mirror portion has reflectance characteristics selected from at least one of the reflectance of 15% to 35% when in a crystalline state and reflectance of 10% or less when in an amorphous state.

Such an optical recording medium has each of a land and a groove, on each of which land and groove recording and erasing of data are to be carried out by phase change between amorphous and crystalline. The reflectance of the mirror portion, when in a crystalline state, is 15% to 35% and/or the reflectance of the mirror portion, when in an amorphous state, is 10% or less.

Furthermore, the present invention provides, according to the second aspect, an optical recording medium having each of a land and a groove on each of which land and groove recording and erasing of data is to be carried out by phase change between amorphous and crystalline, wherein the depth of the groove is $1/7$ to $1/5$ of the wavelength of the reproducing light and the photo-absorbance of the recording layer in the amorphous phase and the photo-absorbance of the recording layer in the crystalline phase satisfy the following Formula (6).

Formula 6:

$$Aa-Ac \leq 10 \quad (6)$$

where Aa is the photo-absorbance (%) of the recording layer in the amorphous phase and Ac is the photo-absorbance (%) of the recording layer in the crystalline phase.

Still furthermore, according to the third aspect, the present invention provides an optical recording medium having a mirror portion and each of a land and a groove, on each of which land and groove recording and erasing of data is to be carried out by phase change between amorphous and crystalline, and which optical recording medium comprises at least a recording layer, dielectric layer and reflecting layer, at least the recording layer containing nitrogen, and the reflectance characteristics of the mirror portion is selected from the reflectances, when in a crystalline state, of 15% to 35% and, when in an amorphous state, of 10% or less.

In the optical recording medium in accordance with the invention any one or more of the above features described with reference to the various aspects may be present.

Moreover, according to the fourth aspect of the present invention, the present invention provides a recording method in which a recording power is directed at an optical recording medium so as to provides an edge type recording system in which recording and erasing are effected by a phase change between amorphous and crystalline states, which recording method comprises directing at a recording medium a series of pulse trains to form respective recording marks, each of which pulse trains comprises a number of recording power pulses, which number is, for each pulse train, independent of the number of the recording power pulses in each other train and is at least one, and each of which pulse trains includes additionally power pulse, of a power lower than an erasing power and of a duration in a range 1.1 to 6, times the duration of the last recording power pulse of the pulse train.

Still moreover, according to the fifth aspect of the present invention, the present invention provides a recording method in which a recording power is directed at an optical recording medium so as to provides an edge type recording system in which recording and erasing are effected by a phase change between amorphous and crystalline states, which recording method comprises directing at a recording medium a series of pulse trains to form respective recording marks, and each of which pulse trains includes additionally a power pulse, after the last said recording power pulse, of a power lower than an erasing power and of a duration in a range 0.6 to 3 times the duration of a window margin.

Thus, an optical recording medium to have information recorded and erased by a phase change between amorphous and crystalline may be irradiated with a recording power by pulse trains, respectively formed by a plurality of recording pulses, to form recorded marks in edge recording. A pulse is provided for irradiating with a power less than the erasing power after the last pulse of each recording pulse train, the duration of said pulse for recording, being 1.1 times to 6 times the duration of the last pulse of the recording pulse train.

DETAILED DESCRIPTION OF THE INVENTION

The present invention is described below in detail.

Since the optical recording medium of the present invention can be high in recording sensitivity, high in signal contrast and less in cross talk, it is necessary to make a configuration, in which the reflectance of the mirror portion in the crystalline state is 15% to 35%. If the reflectance of the mirror portion in the crystalline state is larger than 35%, the recording sensitivity is lowered and the irradiation power for recording and erasure is insufficient, making it difficult to record at a high rotational speed, while the cross talk from the recorded portion of the adjacent track increases. If the reflectance in the crystalline state is smaller than 15%, the difference in reflectance between the crystalline portion and the amorphous portion with recorded marks is small, to make the signal contrast during reproduction small. In view of these, it is more preferable that the reflectance of the mirror portion in the crystalline state is 15% to 30%.

The mirror portion refers to a portion with a mirror surface free from the groove or pre-pits formed. If the reflectance of the mirror portion is measured, the reflectance on the optical recording medium can be accurately measured without being affected by the groove or pre-pits.

Furthermore, it is preferable to make a configuration, in which the reflectance of the mirror portion in the amorphous state is 10% or less. If the reflectance of the mirror portion in the amorphous state is 10% or more, the signals of the adjacent track are easily read during reproduction, to increase the cross talk, for deteriorating the reproduced signals, resulting in the increase of error rate. Furthermore, if the reflectance of the mirror portion in the amorphous state is more than 5%, the servo of the track with recorded marks formed is stable. So, it is especially preferable that the reflectance is 5% to 10%.

Furthermore, in order to keep the land and the groove equal in the amplitude of reproduced signals, for decreasing the cross talk, it is preferable to make a configuration, in which the phase difference between the reflected light in the amorphous state and the reflected light in the crystalline state is kept in a range from 2 n π–π/3 to 2 n π+π/3, or 2 n π+2 π/3 to 2 n π+4 π/3. If the phase difference is not in this range, the amplitude difference between the land and the groove becomes large and the cross talk is also becomes large. If the phase difference is 2 n π–0.1 π to 2 n π+0.1 π, or 2 n π+0.9 π to 2 n π+1.1 π, the amplitude of reproduced signals is especially large more preferably. In the above formulae, n stands for an integer. Furthermore, because amplitude of reproduced signal can be large, it is preferable that the phase difference between the reflected light in the amorphous state and the reflected light in the crystalline state is kept in a rage from 2 n π+0.87 π to 2 n π+1.2 π.

Moreover, in the optical recording medium of the present invention, it is preferable that the depth of the groove is 1/7 to 1/5 of the wavelength of the reproducing light, since the cross talk can be decreased. If the optical path length is less than 1/7 or more than 1/5 of the wavelength of the reproducing light, cross talk increases, making accurate reproduction difficult. Furthermore, to keep the jitter within the value required for the edge recording, it is preferable to make a configuration, in which the difference in absolute value between the photo-absorbance of the recording layer in the amorphous phase and the photo-absorbance in the crystalline phase is smaller than 10%.

If the difference (Aa–Ac) is more than 10%, photo-absorbance in the amorphous phase is still larger than that in the crystalline phase. So, even if both portions are irradiated with same quantity of light, the crystalline portion rises much slower in temperature. Furthermore, at the melting point, temperature increase is suspended in the crystalline portion while the latent heat is absorbed, while temperature rises in the amorphous portion. So the temperature difference between the crystalline portion and the amorphous portion increases much more. After completion of melting, since there is no difference in state between both the portions, equal photo-absorption can be achieved. Therefore, if a proper difference in photo-absorbance is not set, the difference between the tempratures reached in both portions become large. As the results, the marks recorded by overwriting are formed with the different size with being affected by the previous state, and more deformed marks are formed. That is, the jitter will be increased.

The refractive index of the first and second dielectric layers is preferably 1.5 to 2.4, for the signal contrast during reproduction due to the optical interference effect. If the refractive index is less than 1.5, the signal contrast during reproduction cannot be sufficient and if the refractive index is larger than 2.4, the reflectance depends more on the thickness of the dielectric layer.

The thickness of the first dielectric layer is preferably 50 nm or more, because it cannot be easily separated from the substrate or the recording layer and because such defects as cracking are less liable to be caused. Considering the production cost and quality control regarding thickness, a thickness of less than about 200 nm is preferable.

The reflectance can be controlled by any method and for example, can be controlled by adjusting the refractive index and thickness of the first dielectric layer. If a transparent substrate like a policarbonate or glass is used, the refractive index of the substrate is about 1.5 and the refractive index of the first dielectric layer is about 1.5 to 2.4. In order to keep the reflectance of the mirror portion in the crystalline state in a range from 15% to 35% and the reflectance of the mirror portion in the amorphous state in a range of 10% or less by the optical interference effect due to the refractive indexes, it is preferable that the optical path length n1 d1 of the first dielectric layer is in a range expressed by the following formula:

Formula (7)

$$(N/4-0.1)\lambda \leq n1\ d1 \leq (N/4+0.1)\lambda$$

$$1.5 \leq n1 \leq 2.4$$

where n1 is the refractive index of the first dielectric layer; d1 is the thickness (nm) of the first dielectric layer; λ is the wavelength (nm) of light; and N is 1 or 3.

Furthermore, the reflectance can be controlled by letting the recording layer contain nitrogen. The reflectance is controlled by the nitrogen atom concentration in the recording layer. It is preferable that the recording layer is configured to contain 0.1 atom % to 10 atom % of nitrogen. If nitrogen atoms of this range are introduced into the recording layer, the thermal conductivity of the recording layer is lower than that of the recording layer not containing nitrogen atoms and the heat applied to the recording layer goes out less. In this case, recording at a lower power can allowed.

If the nitrogen atom concentration in the recording layer is larger than 10%, the reflectance is so low as to cause an insufficient quantity of light to be reflected, making it difficult to achieve focusing. More preferably, the nitrogen atom concentration is 3.5% or less. If the nitrogen atom concentration is more than 3.5%, the noise is so large as to lower the C/N. If the nitrogen atom concentration of the recording layer is smaller than 0.1%, the effect of changing the reflectance by introducing nitrogen atoms into the recording layer cannot be expected. More preferably, the nitrogen atom concentration is 1% or more.

The thickness of the second dielectric layer is about 1 to about 250 nm. A thickness of 1 to 50 nm is preferable since the range of erase powers to give a good erasability is wide. If the thickness of the second dielectric layer is larger than 50 nm, the merit of the rapid cooling structure cannot be obtained. If the thickness is smaller than 1 nm, the recordability in repeated recording is remarkably lowered. Furthermore, the optical path length n2·d2 of the second dielectric layer is preferably in a range expressed by the following formula:

Formula (8)

$$\lambda(1/50) \leq n2 \cdot d2 \leq \lambda(1/10)$$

$$1.5 \leq n2 \leq 2.4$$

where n2 is the refractive index of the second dielectric layer; d2 is the thickness (nm) of the second dielectric layer; and λ is the wavelength (nm) of light.

In formula (8), if n2·d2 is smaller than λ (1/50) or larger than λ (1/10), it is very difficult to secure the contrast between the crystalline portion and the amorphous portion. Furthermore, if n2·d2 is smaller than λ (1/50), durability (cyclability) is lowered. So, n2·d2 is preferably in the range expressed by the above formula.

To obtain sufficient reproduced signals and to minimize cross talk, n2·d2 should be in the above mentioned range, and, the mirror portion has reflectance characteristics selected from at least one of the reflectance of more than 15% to 35% when in a crystalline state and reflectance of 10% or less when in an amorphous state. And, further, it is also preferable that the phase difference between the reflected light of the amorphous phase and the reflected light of the crystalline phase is 2 n π−π/3 to 2 n π+π/3, more preferably, 2 n π+2 π/3 to 2 n π+4λ/3, to arrange the amplitudes of the land and the groove.

A four-layer configuration consisting of a first dielectric layer, recording layer, second dielectric layer and reflection layer in this order in addition to the substrate is preferable since the rapid cooling structure is liable to be secured with the durability (cyclability) enhanced as a result.

Moreover, a configuration consisting of at least a first dielectric layer, recording layer and photo-absorbable layer is preferable since the photo-absorbance of the recording layer in the amorphous state and the photo-absorbance in the crystalline state can be controlled to further decrease jitter at the time of overwriting. The above mentioned photo-absorbable properties can be incorporated to at least one layer of the optical recording medium of this invention or can be incorporated into a layer separately prepared. Since photo-absorption may accompany heat generation, disc structure design is easy if the photo-absorbable layer is provided as an additional independent layer. For easier realization of the rapid cooling structure, its resultant higher durability (cyclability) and less jitter at the time of overwriting, it is an example to adopt a five-layer configuration consisting of a first dielectric layer, recording layer, second dielectric layer, photo-absorbable layer and reflection layer in addition to the substrate. If the photo-absorbable layer is provided, the reflection layer is not necessarily required, but it is preferable to have the reflection layer in view of sensitivity adjustment and contrast.

The photo-absorbable layer can also function to control the cooling of the recording layer by its thermal conductivity, specific heat, etc. This enables it to control diffusion of the absorbed heat of the recording layer, and to decrease its influence (for example, cross erase) to marks of the next track. In addition to the photo-absorbable layer, by making the reflectance of the mirror portion 15% to 35% when in a crystalline state and/or 10% or less when in an amorphous state, jitter at overwriting becomes small and durability of cross erase becomes high, and cross talk decreases.

The material of the photo-absorbable layer is not especially limited, but can be preferably at least one metal selected from Ti, Zr, Hf, Cr, Ta, Mo, Mn, W, Nb, Rh, Ni, Fe, Y, V, Co, Cu, Zn, Ru, Pd, lanthanides and Te, or any of their mixtures and alloys, since they are excellent in heat resistance, strength and corrosion resistance. Even if the photo-absorbable layer is provided, the thickness of the second dielectric layer is preferably 1 nm to 50 nm, more preferably 1 nm to 30 nm, considering the thermal conductivity, etc.

It is also especially preferable to use an alloy of Si and/or Ge as the photo-absorbable layer. In view of storage stability of the recording medium, it is especially more preferable to use an alloy consisting of one or more metals higher in the absolute value of oxide production heat than Si and/or Ge and Si and/or Ge. In this case, the metal in the alloy of Si and/or Ge can be preferably selected from Be, Al, Se, Ti, Cr, Mn, Fe, Co, Ni, Cu, Y, Zr, Nb, Ru, Rh, Pd, Ag, Hf, Re, Os, Ir, Pt and Au. Above all, Zr, Ti and Hf are more preferable since they are excellent in storage stability. Furthermore, it is preferable that the crystallographic structure of the material of the photo-absorbable layer is substantially amorphous. If the material has a crystalline structure, it can happen that a phase is segregated to make the film heterogeneous, or that the temperature rise during recording of marks causes structural phase transition, to cause film separation, etc., thus lowering the overwrite cyclability.

The material of the recording layer of the present invention is a chalcogen compound mainly composed of Te, which can have at least two states of crystalline state and amorphous state. Preferably, this recording layer is made of ternally alloy Ge, Te and Sb, or comprises an alloy of the three elements of Ge, Te and Sb, plus at least one metal selected from Pd, Nb, Pt, Au, Ag, Ni and Co. Additionally, as previously described, nitrogen may also be present. Thus, the material of the recording layer of the present invention can be selected from, though not limited to, Ge—Sb—Te alloy, Pd—Ge—Sb—Te alloy, Nb—Ge—Sb—Te alloy, Pt—Ge—Sb—Te alloy, Au—Ge—Sb—Te alloy, Ag—Ge—Sb—Te alloy, Ni—Ge—Sb—Te alloy, Co—Ge—Sb—Te alloy, Pd—Nb—Ge—Sb—Te alloy, In—Sb—Te alloy, Ag—In—Sb—Te alloy and In—Se alloy. Among them, Pd—Ge—Sb—Te alloy, Nb—Ge—Sb—Te alloy, Pd—Nb—Ge—Sb—Te alloy, Ni—Ge—Sb—Te alloy, Ge—Sb—Te alloy and Co—Ge—Sb—Te alloy are preferable since many times of repeated rewriting are possible. Especially Pd—Ge—Sb—Te alloy and Pd—Nb—Ge—Sb—Te alloy are preferable because of shorter erasing time, higher repeatability of recording and erasure and excellent recordability such as C/N and erasability. Above all, Pd—Nb—Ge—Sb—Te alloy is more preferable since it is excellent in the properties stated above. It is preferably a layer having the composition as shown by the following formula because they allow repeated rewritings.

Formula (3)

$$M_z(Sb_xTe_{1-x})_{1-y-z}(Ge_{0.5}Te_{0.5})_y$$

$$0.4 \leq x \leq 0.6$$

$$0.3 \leq y \leq 0.5$$

$$0 \leq z \leq 0.05$$

where x, y and a are a molar ratio, respectively; and M comprises, and preferably, elements of at least one of Pd, Nb, Pt, Au, Ag, Ni and Co, more preferably, Pd, Nb or Pt.

The value of y is more preferably 0.3 to 0.4 because of higher durability (cyclability) of rewriting and higher thermal stability in the amorphous state. The value of z is more preferably 0.001 to 0.1, because of the higher crystallization rate, higher durability (cyclability) and higher thermal stability in the amorphous state.

The thickness of the recording layer is preferably 10 nm to 40 nm. If the thickness is less than 10 nm, the contrast in reflectance between the crystalline state and the amorphous state cannot be sufficient. If the thickness is more than 40 nm, the quantity of the thermal conduction of the recording layer is so large as to increase the cross erase.

In the optical recording medium of the present invention, the width of the slope of the groove is preferably 0.2 µm or less, since the groove becomes closer to a rectangle, to intercept on the slope the heat generated when marks are recorded, thereby improving the cross erase durability. However, if the width of the slope of the groove is less than 0.05 µm, it is difficult to separate the substrate from the stamper at the time of substrate molding.

If the track pitch of the optical recording medium of the present invention is less than λ/NA (λ is the wavelength of the recording and reproducing light and NA is the numerical aperture of the lens), cross erase cannot be avoided. If the track pitch is more than 1.5 λ/NA, the track pitch is so wide as to make the high density recording meaningless. So, it is preferable that the track pitch is kept in this range. Furthermore, the rate of the flat portions of the land and the groove to the track pitch is preferably 0.2 to 0.6. If the rate is not in this range, the land and the groove are greatly different in the width of flat portion, to make the amplitude of reproduced signals on the land and the groove greatly different, or the width of the slope of the groove is so wide as to impair the above effect. It is especially preferable that the rate of the flat portions of the land and the groove to the track pitch is 0.3 to 0.5.

The widths of recorded marks of the land and the groove are preferably ½ or more of the respective flat portions of the land and the groove in view of a larger amplitude of the reproduced signals. To prevent the widths of the marks from becoming so large as to cause cross erase, it is preferable that the widths of the recorded marks of the land and the groove are less than the widths of the respective flat portions of the land and the groove.

The material of the substrate of the present invention can be any of various known transparent synthetic resins, or transparent glass, etc. To avoid the influence of the flaws, etc. of the substrate, it is preferable to use a transparent substrate and to use a focused beam for recording from the substrate side. The material of the transparent substrate can be selected from glass, polycarbonates, polymethyl methacrylate, polyolefin resins, epoxy resins, polyimide resins, etc. Especially a polycarbonate resin or amorphous polyolefin resin is preferable because of small optical birefringence, low hygroscopicity and easy molding.

The thickness of the substrate is preferably in a range expressed by the following formula.

Formula (5)

$$0.01 \leq (NA)^3 \cdot d \leq 0.20$$

where NA is the numerical aperture of the objective lens and d is the thickness (mm) of the substrate.

Since the coma is proportional to the product of the third power of NA and the thickness d of the substrate, it is liable to be affected by the tilt of the disc, making it difficult to raise the recording density, if the value of the above formula is larger than 0.20. If the value is less than 0.01, the influence of dust, flaws, etc. is liable to affect even when it is recorded from the substrate side with a focused optical beam.

The substrate can be either flexible or rigid. A flexible substrate can be a tape, sheet or card. A rigid substrate can be a card or disc. It is also possible to combine two substrates with the recording layer, etc. formed respectively, in an air-sandwiched structure, air-incident structure, or contact-bonded structure.

In the present invention, the dielectric layers are effective for protecting the substrate and the recording layer from heat, for example, to prevent the substrate and the recording layer from being deformed by heat during recording, thereby preventing the deterioration of recordability and also effective for improving the signal contrast at the time of reproduction by optical interference effect. The dielectric layers can be inorganic thin films of ZnS, $SiO_2$, silicon nitride or aluminum oxide, etc. Especially, a thin film of ZnS, a thin film of the oxide of a metal such as Si, Ge, Al, Ti, Zr, or Ta, a thin film of the nitride of Si, or Al, etc. a thin film of the carbide of Ti, Zr, or Hf, etc. and a film of any of their compounds are preferable since they are high in heat resistance. The refractive index of the thin film is 1.5 to 2.4. Furthermore, any of these thin films containing carbon or fluoride such as $MgF2$ can be preferably used since the residual stress of the film is small. Especially a film made of a mixture consisting of ZnS and $SiO_2$ and a film made of a mixture consisting of ZnS, $SiO_2$ and carbon are preferable, since the deterioration of recording sensitivity, carrier-to-noise ratio (C/N), erasability (the difference between the reproduced carrier signal intensity after recording and that after erasure), etc. is less liable to occur even after repeated recording and erasure. The ratio of the chalcogen compound, silicon dioxide and carbon is not especially limited, but it is more preferable that the mixture contains 15 to 35 mol % of silicon dioxide and 1 to 15 mol % of carbon since the effect of decreasing the internal stress of the dielectric layers is large.

The material of the reflection layer can be selected from metals with photo-reflectability such as Al and Au, alloys consisting of any one of these metals as a main element and another element such as Ti, Cr or Hf, etc. and mixtures obtained by mixing a metallic compound such as a metal nitride, metal oxide or metal chalcogenide of Al, Si, etc. with a metal such as Al or Au. Metals such as Al and Au and alloys mainly composed of any one of them are preferable, since they are highly photo-reflectable, can enhance the thermal conductivity and can quickly diffuse the heat at the time of recording, to keep the cross erase small as a result. The alloys include those obtained by adding 0.1 to 15 atom % of at least one element selected from Si, Mg, Cu, Pd, Ti, Cr, Hf, Ta, Nb, Mn, etc. to Al and those obtained by adding 1 to 20 atom % of at least one element of Cr, Ag, Cu, Pd, Pt, Ni, etc. to Au. Especially aluminum or an alloy mainly composed of Al is preferable, since the material cost can be low and an alloy obtained by adding 0.5 to 5 atom % of at least one metal selected from Ti, Cr, Ta, Hf, Zr, Mn and Pd to Al is preferable, since corrosion resistance is good. Furthermore, it is preferable to use an alloy consisting of Al as a main ingredient and 0.5 to less than 3 atom % in total of other elements, such as Al—Hf—Pd alloy, Al—Hf alloy, Al—Ti alloy, Al—Ti—Hf alloy, Al—Cr alloy, Al—Ta alloy, Al—Ti—Cr alloy or Al—Si—Mn alloy, because corrosion resistance is good and because hillocks, etc. are hard to occur. Among these Al alloys, an Al—Hf—Pd alloy represented by the following formula has especially excellent thermal stability and so can lessen the deterioration of recordability in many times of repeated recording and erasure.

$$Pd_j Hf_k Al_{1-j-k}$$

$$0.001 < j < 0.01$$

$$0.005 < k < 0.10$$

where j and k stand for the number of atoms the element concerned (the number of moles of the element concerned).

The thickness of the above-mentioned reflection layer is about 10 nm to about 200 nm, even if any of the above alloys is used. More, preferably, it is 30 nm to 200 nm.

The light source used for recording on the optical recording medium of the present invention can be a high intensity light source such as a laser beam or stroboscopic beam. Especially a semiconductor laser beam is preferable, because of smaller size, less power consumption and easy modulation. In the present invention, the laser beam used for recording and reproduction is not especially limited in wavelength. The recording density depends on the diameter of the laser beam spot used for recording and reproduction (laser beam spot diameter, $\lambda/NA$, where $\lambda$ is the wavelength of the laser beam and NA is the numerical aperture of the lens). Since the recording density can be made higher when the diameter is smaller, the wavelength of the laser beam is 850 nm or less, preferably 800 nm or less, more preferably 700 nm or less. It is further more preferable to use a green or blue laser beam, etc.

For recording, the recording layer in the crystalline state is irradiated with laser beam pulses, to form amorphous recorded marks. As another method, on the contrary, the recording layer in the amorphous state can have crystalline recorded marks formed. Erasure can be achieved by making the amorphous recorded marks crystalline, or making the crystalline recorded marks amorphous by laser beam irradiation. It is preferable to form amorphous recorded marks when recording and to crystallize them when erasing, because the recording speed can be higher and because the recording layer is less deformed. One-beam overwriting of overwriting by one time of beam irradiation with the light intensity for forming recorded marks kept high and that for erasure kept rather low is preferable since the overwriting time can be short.

In the recording method of the present invention, after each pulse train formed by a plurality of recording pulses is applied for recording, a recording mark other than the shortest recording mark is formed by applying a pulse with a power smaller than the erasing power and subsequently restoring the erasing power. By this method, the jitter at the rear end of the recorded mark is decreased. Since a pulse with a power smaller than the erasing power is additionally applied, the cooling rate at the trailing edge of each recorded mark, where the temperature rises more than at the leading edge at the time of recording, can be raised. Therefore, even if the reached temperature changes depending on whether the trailing edge of each recorded mark is in the crystalline state or the amorphous state before overwriting, the coarse grains formed outside the region molten by irradiation with a laser beam do not grow so much, since the cooling rate is high and accurate recording can be achieved at the edge of the trailing edge. The duration of the pulse with a power smaller than the erase power must be 0.6 times to 3 times the window. If the duration of the pulse is shorter than the range, the intended effect cannot be obtained and if longer than the range, a portion where the temperature does not rise above the crystallization temperature occurs, to lower erasability, worsening the jitter as a result. Preferably, the duration of the pulse is 0.7 times to 1.8 times the window. Furthermore, when the modulation system is of (1, 7) RLL code, it is especially preferable that the duration of the pulse is 0.7 times to 1.8 times the duration of the last pulse of the pulse train and if the modulation system is 8/15 or 8/16 (EFM pulse) modulation, it is especially preferable that the duration of the pulse is 0.7 times to 1.8 times the window.

Since the above effect can be obtained by additionally using a pulse with a power smaller than the erasing power, it is preferable that the time after completion of the last pulse of the pulse train till the irradiation with the additional pulse is preferably 1 times or less of the window. If the time is longer than it, it is difficult to obtain the intended effect of the pulse. Especially it is preferable to irradiate with the pulse immediately after completion of the last pulse of the pulse train. It is preferable that the power to be applied for irradiation and smaller than the erasing power is no more than $\frac{1}{2}$ of the erasing power. If said power is more than $\frac{1}{2}$, the effects of off pulse is not easy to be obtained because the lowering speed of the temperature at the trailing edge of the recording mark becomes slow.

Furthermore, the duration of the first pulse of the pulse train is preferably 0.7 times to 2 times the window, to prevent that the mark is tapered at the leading edge of the mark due to insufficient heating.

Like (1,7)RLL, in a mudulation system of in which the shortest recording mark is 2T (T is window margin), the duration of the first recording pulse is, preferably, equal to the window margin. Like 8/15 or 8/16 mudulation system, it is particularly preferable that the duration of the first recording pulse is 1.5 times of the window margin. For simplification of apparatus, it is preferable that the durations of the pulse train other than that of the first recording pulse are same with each other. Particularly, it should be $\frac{1}{2}$ of the window margin. On the other hand, it is not necessary that the pulse powers of the first recording pulse and the other pulses are same with each other.

Furthermore, the following recording method is preferable. The position of the first pulse of recording pulses used for forming a recorded mark is decided in reference to the length of the recorded mark and to the interval between said recorded mark and the recorded mark immediately before said recorded mark and/or the position of the last pulse of recording pulses for forming a recorded mark is decided in reference to the length of said recorded mark and to the interval between said recorded mark and the recorded mark immediately after said recorded mark. Furthermore, a pulse for applying a power smaller than the erasing power is provided after the last pulse of the recording pulses. According to this method, the jitter characteristic during overwriting can preferably be improved.

The laser beam power of the pulse smaller than the erasing power is preferably $\frac{1}{2}$ or less of the erasing power and can also be zero (that is, no laser beam irradiation during this time). The reason is that if the smaller power of the pulse is larger than $\frac{1}{2}$ of the erasing power, the cooling rate at the trailing edge of the recorded mark cannot be raised and the intended effect is difficult to obtain.

Moreover, in this recording method, the recorded marks can be formed only in the groove of the optical recording medium, or formed only on the land, or formed on both the land and the groove of one optical recording medium.

The method for producing the optical recording medium of the present invention is described below.

The method for forming the reflection layer and the recording layer on the substrate can be any known method for forming a thin film in vacuum, for example, vacuum evaporation, ion plating, or sputtering, etc. Especially in view of easy control of thickness and composition, sputtering is preferable. To let the recording layer contain nitrogen by a method for forming a thin film in vacuum, if an atmosphere gas containing nitrogen is used in a vacuum vessel, or if a target or evaporation source containing nitrogen is used, nitrogen atoms can be easily introduced into the recording layer.

The thickness of the recording layer, etc. formed can be easily controlled by monitoring the deposition state using a known technique quartz oscillator film thickness meter, etc.

The formation of the recording layer, etc. can be achieved with the substrate fixed, or conveyed or rotated. It is preferable to rotate the substrate around itself and it is more preferable to rotate the substrate on its axis while revolving the substrate around an axis outside the subject, since the layer obtained is excellent in the in-plane uniformness of the thickness.

A preferable layer composition of the optical recording medium of the present invention is a laminate of a transparent substrate, first dielectric layer, recording layer, second dielectric layer and reflection layer in this order, or a laminate of a transparent substrate, first dielectric layer, recording layer, second dielectric layer, photo-absorbable layer and reflection layer in this order, etc. The layer composition is not limited to these and as far as the effect of the present invention is not remarkably impaired, a dielectric layer of ZnS, $SiO_2$, etc. or a resin protective layer of an ultraviolet setting resin, etc. can be provided as required after forming the reflection layer, etc. for prevention of flawing and deformation, etc. Light should be incident on the transparent substrate side. Furthermore, after forming the reflection layer, etc. or after further forming the resin protective layer, two substrates can also be bonded together using an adhesive.

It is preferable that the recording layer is crystallized by irradiation with such light as a laser beam or xenon flash lamp before actual recording.

The present invention is described below based on examples.

(Analyzing and measuring methods)

The chemical compositions of the reflection layer and the recording layer were confirmed by using an ICP emission analyzer (produced by Seiko Denshi Kogyo K.K.). The carrier-to-noise ratio, the erasability (difference between the reproduced carrier signal intensity after recording and that after erasure), cross talk and cross erase were measured by a spectrum analyzer using the drive unit used for recording, or a drive with an optical head equivalent to it (in the wavelength of the laser beam and the NA of the objective lens). The jitter was defined as the standard deviation of zero cross points of reproduced signals measured by a time interval analyzer. The nitrogen atom concentration in the recording layer was confirmed by NRA (nuclear reaction analysis).

The thicknesses of the recording layer, dielectric layers and reflection layer during their formation were monitored by a quartz oscillator film thickness gauge. The thicknesses of the respective layers were measured by observing each cross section by a transmission electron microscope.

Furthermore, the reflectance of the mirror portion was measured by measuring the mirror portion on the disc by a spectrophotometer, or by observing the level of reflection of the reproducing light by the mirror portion in a pre-pit, by an oscilloscope, using the drive unit used for recording, or a drive with an optical head equivalent to it (in the wavelength of the laser beam and the NA of the object lens).

EXAMPLE 1

A polycarbonate substrate of 0.6 mm in thickness, 72 nm in groove width, 12 cm in diameter and with a spiral groove of 1.4 μm in pitch (0.55 μm in the flat portion of the land, 0.55 μm in the flat portion of the groove and 0.15 μm in the slope of the guide groove) was revolved at 30 rpm, to form a recording layer, dielectric layers and reflection layer by high frequency sputtering.

At first, a vacuum vessel was evacuated to $1\times10^{-3}$ Pa and in Ar gas atmosphere of $2\times10-1$ Pa, ZnS containing 20 mol % of $SiO_2$ was sputtered, to form a 100 nm thick first dielectric layer on the substrate. Then, a target consisting of Pd, Nb, Ge, Sb and Te was sputtered, to form a 25 nm recording layer with a composition of $Nb_{0.45}Pd_{0.05}Ge_{19.0}Sb_{25.5}Te_{55.0}$. Furthermore, a 15 nm second dielectric layer similar to said first dielectric layer was formed and on it, a target consisting of $Al_{98.1}Hf_{1.7}Pd_{0.2}$ was sputtered, to form a 150 nm reflection layer.

The disc was taken out of the vacuum vessel and the reflection layer was spin-coated with an acrylic type resin, and the resin was cured with ultraviolet ray, for forming a 10 μm thick resin layer, thus producing an optical recording medium of the present invention. It was bonded to another similarly produced disc using a hot melt adhesive to prepare a double-sided disc.

A semiconductor laser beam with a wave length of 830 nm is applied to this optical recording medium, and the whole area of the recording layer of the disk is crystallized for initialization.

The reflectances of the crystalline portion and the amorphous portion were measured at mirror portions and found to be 27% in the crystalline portion and 8% in the amorphous portion. From the refractive indexes and the thicknesses of the respective layers, the phase difference between the reflected light of the reproducing light of the crystalline portion and that of the amorphous portion was calculated and found to be 0.1 π ((Phase of reflected light of amorphous portion)—(Phase of reflected light of crystalline portion)).

Subsequently on the land and the groove, marks were overwritten 100 times at a linear velocity of 4.4 m/second, using an optical head of 0.6 in the numerical aperture of the objective lens and 680 nm in the wavelength of the semiconductor laser beams, using a known technique of pulse train to form recorded marks equivalent to 2T (T=window margin) of (1,7) RLL (the frequency for reproduction 4.2 MHz) in the edge recording and using a semiconductor laser beam modulated to peak power (recording power) of 7 to 15 mW and the bottom power (erase power) of 2 to 6 mW. Then, a semiconductor laser beam of 1.2 mW in read power was used for irradiation and C/N values were measured with a band width of 30 kHz.

Furthermore, the portions were irradiated to have 7T (1.2 MHz) marks, using a semiconductor laser beam modulated as described above, for one-beam overwriting and the erasabilities of 2T marks in this case were measured.

On both the land and the groove, C/N values of practically sufficient 50 dB or more were obtained at peak powers of 9 mW or more and the differences of C/N values between the land and the groove at respective peak powers were as small as less than 1 dB.

The erasability was practically sufficient 20 dB or more on both the land and the groove at a bottom powers of 3 to 5 mW and 30 dB at the maximum.

The difference between the intensity of the signals recorded on the groove (or land) and the intensity of the reproduced signals of the land (or groove) with no signal written adjacent to the recorded track was defined as the of cross talk and measured.

On the land, marks were overwritten 100 times at a frequency of 4.2 MHz, using a semiconductor laser beam modulated to a bottom power of 4.5 mW and peak power of 9 to 15 mW and the adjacent groove was irradiated using a semiconductor laser beam with a read power of 1.2 mW and the cross talk were measured with a band width of 30 kHz and found to be practically sufficient −30 to −27 dB. Furthermore, on the groove, marks were overwritten 100 times under the same conditions and the of cross talk on the adjacent land were measured and found to be as obtained for the groove.

Moreover, the C/N measured when signals of 4.2 MHz in frequency were overwritten on the groove (or land) 100 times using a semiconductor laser beam modulated to a peak power kept at 10 mW and with the bottom power kept at 4.5 mW was compared with the C/N measured after signals of 1.2 MHz in frequency were overwritten 10000 times on the land (or groove) in the adjacent tracks using a semiconductor laser beam modulated similarly and the decrease was defined as the cross erase. The cross erase were measured and found to be as small as less than 1 dB.

An optical recording medium with quite the same configuration as above was prepared and marks equivalent to 8T (1.1 MHz) were recorded, using a semiconductor laser beam modulated to a peak power kept at 10 mW and bottom power kept at 4.5 mW and observed by a transmission electron microscope. On both the land and the groove, the widths of the marks were 0.46 μm, which accounted for 84% of the flat portions of the land and the groove, respectively.

Furthermore, the optical recording medium was placed in an environment of 80° C. and 80% relative humidity for 1000 hours and the recorded portion was reproduced. The C/N changed as little as less than 2 dB.

EXAMPLE 2

An optical recording medium identical with that of Example 1, except that the thickness of the first dielectric layer was 85 nm, that the thickness of the recording layer was 22 nm, that the thickness of the second dielectric layer was 10 nm, and that the thickness of the reflection layer was 100 nm was prepared as described in Example 1.

The reflectances of the crystalline portion and the amorphous portion were measured at mirror portions and were found to be 21% in the crystalline portion and 6% in the amorphous portion. From the refractive indexes and thicknesses of the respective layers, the phase difference between the reflected light of reproducing light of the crystalline portion and that of the amorphous portion was calculated and found to be $\pi$ ((Phase of reflected light of amorphous portion)—(Phase of reflected light of crystalline portion )).

On both the land and the groove, marks were overwritten at a linear velocity of 5.8 m/second, using an optical head of 0.6 in the numerical aperture of the objective lens and 680 nm in the wavelength of the semiconductor laser beam and using pulse train to form recorded marks equivalent to the shortest mark (3T:T=window margin) of 8/16 (EFM plus) modulation system (the frequency for reproduction 4.7 MHz) in the edge recording and as described in Example 1, C/N values were measured similarly.

Furthermore, the portions were irradiated using a semiconductor laser beam modulated as described before, at a frequency of 1.3 MHz (11 Tw) for reproduction, for one-beam overwriting and the erasabilities of 3T marks were measured.

On both the land and the groove, C/N values of practically sufficient 50 dB or more and 57 dB at the maximum could be obtained at peak powers of 9.0 mW or more. The differences in C/N value between the land and the groove at the respective peak powers were as little as less than 1 dB. Also for the erasability, similar values as in Example 1 could be obtained at a peak power of 10.5 mW.

The cross talk was measured as described in Example 1, except that the recording frequency was 4.7 MHz and that the peak power was 10.5 mW. The cross talk were as sufficiently small as −30 dB to −27 dB as found in Example 1.

The cross erase was measured as described in Example 1, except that the recording frequency for the track to be measured was 4.7 MHz, that the recording frequency for the adjacent tracks was 1.3 MHz and that the peak power was 10.5 mW. The cross erase were as sufficiently small as less than 1 dB.

EXAMPLE 3

An optical recording medium identical with that of Example 1 was prepared, except that 8 mol % carbon atom was incorporated to the first and the second dielectric layers.

C/N values, erasabilities, cross erase and cross talk were measured as described in Example 1 and similar results as Example 1 were obtained.

Comparative Example 1

An optical recording medium identical with that of Example 1, except that the thickness of the first dielectric layer was 320 nm was prepared as described in Example 1 and respective properties were measured as described in Example 1, except that the peak power and bottom power for measuring the C/N and the cross talk were changed.

The reflectances of the crystalline portion and the amorphous portion were measured at mirror portions and found to be 40% in the crystalline portion and 18% in the amorphous portion. From the refractive indexes and thicknesses of the respective layers, the phase difference between the reflected light of reproducing light of the crystalline portion and that of the amorphous portion was calculated and found to be $0.1\pi$ ((Phase of reflected light of amorphous portion)—(Phase of reflected light of crystalline portion )).

Respective properties were measured as described in Example 1, using a semiconductor laser beam modulated to a peak power of 10 to 15 mW and the bottom power of 4 to 8 mW. On the land, C/N values of practically sufficient 50 dB or more could be obtained at peak powers of 11 mW or more and erasabilities of practically sufficient 20 dB or more, 30 dB at the maximum could be obtained at bottom powers of 4 to 8 mW. Similar properties were obtained also on the groove.

Cross erase was measured as described in Example 1, except that the peak power was kept at 12 mW and that the bottom power was kept at 5.5 mW and found to be as small as less than 1 dB.

However, on the land, with a semiconductor laser beam modulated to a bottom power kept at 5.5 mW and the peak power 11 to 15 mW, the cross talk was measured as described in Example 1 and was found to be as large as −18 to −15 dB, a level at which the correct reproduction of recorded data was difficult. Also on the groove, similar values were obtained. From this, it can be seen that since the reflectance was high in this layer composition, the cross talk was so large as to make it difficult to record signals on both the land and the groove tracks.

Comparative Example 2

An optical recording medium identical with that of Comparative example 1 was prepared, except that the thickness of the first dielectric layer was changed to 305 nm.

The reflectances of the mirror portion were 37% in crystalline portion and 14% in amorphous portion. From the refractive indexes and thicknesses of the respective layers, the phase difference between the reflected light of reproducing light of the crystalline portion and that of the amorphous portion was calculated and found to be $0.1\pi$.

As to C/N values, erasabilities and cross erase, similar results as Comparative example 1 were obtained.

The cross talk was measured as described in Example 1 and was found to be as large as −18 to −23 dB, a too high level at which the correct reproduction of recoaded data was difficult.

EXAMPLE 4

A polycarbonate substrate of 0.6 mm in thickness, 72 nm in groove depth, 12 cm in diameter and with a spiral groove of 1.4 μm in pitch (0.55 μm in the flat portion of the land, 0.55 μm in the flat portion of the groove and 0.15 μm in the slope of the guide groove) was revolved at 30 rpm, to form a recording layer, dielectric layers and reflection layer by high frequency sputtering.

At first, a vacuum vessel was evacuated to $1\times10^{-3}$ Pa and in Ar gas atmosphere of $2\times10^{-1}$ Pa, ZnS containing 20 mol % of $SiO_2$ was sputtered, to form an 85 nm thick first dielectric layer on the substrate. Subsequently, a target consisting of Pd, Nb, Ge, Sb and Te was sputtered, to form a 20 nm thick recording layer with the composition of $Nb_{0.45}Pd_{0.05}Ge_{19.0}Sb_{25.5}Te_{55.0}$. Furthermore, a 10 nm thick second dielectric layer similar to the first dielectric layer was formed. Moreover, a target consisting of $Al_{98.1}Hf_{1.7}Pd_{0.2}$ was sputtered, to form a 100 nm thick reflection layer.

The disc was taken out of the vacuum vessel and the reflection layer was spin-coated with an acrylic resin and it was cured with ultraviolet rays, for forming a 10 λm thick resin layer, thus producing an optical recording medium of the present invention. It was bonded to another similarly produced disc using a hot melt adhesive, to produce a double-sided disk.

A semiconductor laser beam with a wave length of 830 nm is applied to this optical medium, and the whole area of the recording layer of the disk is crystallized for initiallization. The reflectances of the crystalline portion and the amorphous portion were measured at mirror portions and found to be 20% in the crystalline portion and 7% in the amorphous portion. From the refractive indexes and thicknesses of the respective layers, the reflectances and absorbances of the crystalline portion and the amorphous portion of the disc at mirror portions and the phase difference between the reflected light of reproducing light of the crystalline portion and that of the amorphous portion were calculated. The reflectances were found to be 20% in the crystalline portion and 6.5% in the amorphous portion. The absorbances were found to be 77% in the crystalline portion and 81% in the amorphous portion and the phase difference was found to be 0.9 π ((Phase of reflected light of crystalline portion)— (Phase of reflected light of amorphous portion )).

Subsequently on the land and the groove, marks were overwritten 100 times at a linear velocity of 6.5 m/second, using an optical head of 0.6 in the numerical aperture of the objective lens and 680 nm in the wavelength of the semiconductor laser beam, using a known technique of pulse train to form recorded marks equivalent to 3T of 8/15 modulation (the frequency for reproduction 4.4 MHz) in the edge recording and using a semiconductor laser beam modulated to a peak power from 7 to 15 mW and bottom power from 2 to 6 mW. Then, a semiconductor laser beam of 1.2 mW in reproducing power was used for irradiation and C/N values were measured with a band width of 30 kHz.

Furthermore, the portions were irradiated to have 13T (1.0 MHz) marks, using a semiconductor laser beam modulated as described above, for one-beam overwriting and the erasabilities of 3T marks in this case were measured.

On both the land and the groove, C/N values of practically sufficient 50 dB or more were obtained at peak powers of 9 mW or more and the differences of C/N values between the land and the groove at respective peak powers were as small as less than 1 dB.

The erasabilities were practically sufficient 20 dB or more on both the land and the groove at bottom powers of 3 to 5 mW and 33 dB at the maximum.

Furthermore, on both the land and the groove, a random pattern was recorded 100 times with the bottom power from 4 to 6.5 mW and the jitter values after recording 13T or 3T marks once were measured. The jitter values at both the leading and trailing edges at 13T and 3T marks were better than desired value of 4.9 nsec, which corresponds to 13% of the window margin of 38 nsec.

The difference between the intensity of the signals recorded on the groove (or land) and the intensity of the reproduced signals of the land (or groove) with no signal written adjacent to the recorded track was defined as the cross talk and measured.

On the land, marks were overwritten 100 times at a frequency of 4.4 MHz, using a semiconductor laser beam modulated to a bottom power kept at 4.5 mW and peak power from 9 to 15 mW and the adjacent groove was irradiated, using a semiconductor laser beam with the read power kept at 1.2 mW and the cross talk were measured with a band width of 30 kHz and found to be practically sufficient −30 to −27 dB. Furthermore, on the groove, marks were overwritten 100 times under the same conditions and the cross talk on the adjacent land were measured and found to be as obtained for the groove.

EXAMPLE 5

An optical recording medium was prepared as described in Example 4, except that the thicknesses of the first dielectric layer, the recording layer of $Ge_2Sb_2Te_5$ in chemical composition, the second dielectric layer and the reflection layer were 240 nm, 18 nm, 15 nm and 150 nm, respectively.

The reflectances of the crystalline portion and the amorphous portion of this disc were measured at mirror portions and found to be 18% in the crystalline portion and 8% in the amorphous portion. Furthermore, from the refractive indexes and thicknesses of the respective layers, the reflectances and absorptances of the crystalline and amorphous portions at mirror portions and the phase difference between the reflected light of reproducing light of the crystalline portion and that of the amorphous portion were calculated. The reflectances were found to be 18% in the crystalline portion and 8% in the amorphous portion and the absorptances were found to be 80% in the crystalline portion and 81% in the amorphous portion. The phase difference was found to be 0.9 π ((Phase of reflected light of crystalline portion)—(Phase of reflected light of amorphous portion )).

Subsequently, C/N values, erasabilities and jitter values were measured as described in Example 4, except that different peak powers and bottom powers were used.

On both the land and the groove, C/N values of practically sufficient 50 dB or more were obtained at peak powers of 9 mW or more and the differences of C/N values between the land and the groove at respective peak powers were as small as less than 1 dB.

The erasabilities were practically sufficient 20 dB or more on both the land and the groove at bottom powers of 3 to 5 mW and 32 dB at the maximum.

Furthermore, on both the land and the groove, a random pattern was recorded 100 times with the bottom power from 3 to 5.5 mW and the jitter values after recording 13T or 3T marks once were measured. The jitter values at both the leading and trailing edges at 13T and 3T were almost the same as Example 4, which is well within the desired value.

EXAMPLE 6

An optical recording medium was prepared as described in Example 4, except that the thickness of the first dielectric layer was 280 nm, that a target consisting of Ge, Sb, Te and Nb was sputtered to form a 19 nm thick recording layer with a composition of $Nb_{0.5}Ge_{17.5}Sb_{26.0}Te_{56.0}$, that the thickness of the second dielectric layer was 10 nm, that a Ti target was sputtered on them, to form a 40 nm thick photo-absorbable layer and that the thickness of the reflection layer was 70 nm. The reflectances of the crystalline portion and the amorphous portion of this disc were measured at mirror portions and found to be 28% in the crystalline portion and 8% in the amorphous portion. Furthermore, from the refractive indexes and thicknesses of the respective layers, the reflectances and absorptances of the crystalline and amorphous portions at mirror portions and the phase difference between the reflected light of reproducing light of the crystalline portion and that of the amorphous portion were calculated. The reflectances were found to be 28.8% in the crystalline portion and 8.5% in the amorphous portion and the absorptances were found to be 56.9% in the crystalline portion and 50.3% in the amorphous portion. The phase difference was found to be $0.2 \pi$ ((Phase of reflected light of crystalline portion)—(Phase of reflected light of amorphous portion )).

Subsequently, C/N values, erasabilities and jitter values were measured as described in Example 4.

On both the land and the groove, C/N values of practically sufficient 50 dB or more were obtained at peak powers of 10 mW or more and the differences of C/N values between the land and the groove at respective peak powers were as small as less than 1 dB.

The erasabilities were practically sufficient 20 dB or more on both the land and the groove at bottom powers of 4 to 7 mW and 33 dB at the maximum.

Furthermore, on both the land and the groove, a random pattern was recorded 100 times with the bottom power from 4 to 6 mW and the jitter values after recording 13T or 3T marks once were measured. The jitter values at both the leading and trailing edges of 13T and 3T marks were almost the same as Example 4, which was well within the desired value.

EXAMPLE 7

An optical recording medium identical with that of Example 6 was prepared, except that the chemical composition of photo-absorbable layer was changed to TiSi2. Similar results as Example 6 were obtained.

EXAMPLE 8

A polycarbonate substrate of 120 mm in diameter, 0.6 mm in thickness, 72 nm in groove width and with a spiral groove of 1.4 $\mu$m in pitch (0.55 $\mu$m in the flat portion of the land, 0.55 $\mu$m in the flat portion of the groove and 0.15 $\mu$m in the slope of the guide groove) was revolved at 30 rpm, to form a recording layer, dielectric layers and reflection layer by sputtering.

At first, a vacuum vessel was evacuated to $6 \times 10^{-4}$ Pa and in Ar gas atmosphere of $2 \times 10^{-1}$ Pa, ZnS containing 20 mol % of $SiO_2$ was sputtered at a high frequency, to form an 85 nm thick first dielectric layer on the substrate. Then, a target consisting of Pd, Nb, Ge, Sb and Te was sputtered at a high frequency in a mixed gas consisting of 98% of Ar gas and 2% of $N_2$ gas, to form a 27.5 nm thick recording layer of $Nb_{0.4}Pd_{0.1}Ge_{18.3}Sb_{26.9}Te_{54.3}$ in chemical composition. Furthermore, a 10 nm thick second dielectric layer similar to said first dielectric layer was formed and on it, a target consisting of $Al_{98.1}Hf_{1.7}Pd_{0.2}$ was sputtered, to form a 100 nm thick reflection layer.

The disc was taken out of the vacuum vessel and the reflection layer was spin-coated with an acrylic resin which was cured with ultraviolet rays, for forming a 10 $\mu$m thick resin layer, thus producing an optical recording medium of the present invention.

The nitrogen atom concentration of the recording layer of the optical recording medium was 1.4%.

A semiconductor laser beam with a wave length of 830 nm is applied to this optical medium, and the whole area of the recording layer of the disk is crystallized for initialization.

The reflectances of the crystalline portion and the amorphous portion were measured at mirror portions and found to be 18% in the crystalline portion and 6% in the amorphous portion.

Furthermore, from the refractive indexes and thicknesses of the respective layers, the phase difference between the reflected light of the reproducing light of the crystalline portion and that of the amorphous portion were calculated. The phase difference was found to be $1.1 \pi$ ((Phase of reflected light of amorphous portion)—(Phase of reflected light of crystalline portion)).

Subsequently on the land and the groove, marks were overwritten 100 times at a linear velocity of 5.8 m/second, using an optical head of 0.6 in the numerical aperture of the objective lens and 680 nm in the wavelength of the semiconductor laser beam, to form recorded marks equivalent to 3T of 8/16 modulation (the frequency for reproduction 4.7 MHz) in the edge recording and using a semiconductor laser beam modulated to a peak power from 7 to 15 mW and bottom power from 2 to 6 mW. Then, a semiconductor laser beam of 1.2 mW in read power was used for irradiation and C/N values were measured with a band width of 30 kHz.

Furthermore, the portions were irradiated to have 11T (1.3 MHz) marks, using a semiconductor laser beam modulated as described above, for one-beam overwriting and the erasabilities of 3T marks in this case were measured.

As a result of the measurement, on both the land and the groove, C/N values of practically sufficient 50 dB or more were obtained at peak powers of 9 mW or more and the differences of C/N values between the land and the groove at respective peak powers were as small as less than 1 dB.

The erasabilities were practically sufficient 20 dB or more on both the land and the groove at bottom powers of 3 to 5 mW and 33 dB at the maximum.

The difference between the intensity of the signals recorded on the groove (or land) and the intensity of the reproduced signals of the land (or groove) with no signal written adjacent to the recorded track was defined as the cross talk and measured.

On the land, marks were overwritten 100 times at a frequency of 4.7 MHz, using a semiconductor laser beam modulated to a bottom power kept at 4.5 mW and peak power from 9 to 15 mW and the adjacent groove was irradiated with a semiconductor laser beam with the read power kept at 1.2 mW. The cross talk were measured with a band width of 30 kHz and found to be practically sufficient −33 to −28 dB. Furthermore, on the groove, marks were overwritten 100 times under the same conditions and the cross talk on the adjacent land were measured and found to be as obtained for the groove.

Moreover, the C/N measured when signals of 4.7 MHz in frequency were overwritten on the groove (or land) 100 times using a semiconductor laser beam with the peak power kept at 10 mW and bottom power kept at 4.5 mW was compared with the C/N measured after signals of 1.0 MHz in frequency were overwritten 10000 times on the land (or groove) in the adjacent tracks using a semiconductor laser beam modulated similarly and the decrease was defined as the cross erase. The cross erase were measured and found as small as less than 1 dB. An optical recording medium with quite the same configuration as above was prepared and marks equivalent to 11T (1.3 MHz) were recorded using a semiconductor laser beam with the peak power kept at 10 mW and with the bottom power kept at 4.5 mW and observed by a transmission electron microscope. On both the land and the groove, the widths of the marks were 0.5 $\mu$m, which accounted for 91% of the flat portions of the land and the groove, respectively. Furthermore, the optical recording medium was placed in an environment of 80° C. and 80% relative humidity for 1000 hours and the recorded portion was reproduced. The C/N changed as little as less than 2 dB.

EXAMPLE 9

A polycarbonate substrate of 0.6 mm in thickness, 72 nm in groove width, 12 cm in diameter and with a spiral groove of 1.4 $\mu$m in pitch (0.7 $\mu$m in groove width) was revolved at 30 rpm, to form a recording layer, dielectric layers and reflection layer by high frequency sputtering.

At first, a vacuum vessel was evacuated to $1 \times 10^{-3}$ Pa and in Ar gas atmosphere of $2 \times 10^{-1}$ Pa, ZnS containing 20 mol % of $SiO_2$ was sputtered, to form an 85 nm thick first dielectric layer on the substrate. Then, a target consisting of Pd, Nb, Ge, Sb and Te was sputtered, to form a 25 nm thick recording layer of $Nb_{0.45}Pd_{0.05}Ge_{19.0}Sb_{25.5}Te_{55.0}$ in chemical composition. Furthermore, a 15 nm thick second dielectric layer similar to said first dielectric layer was formed and on it, a target consisting of $Al_{98.1}Hf_{1.7}Pd_{0.2}$ was sputtered, to form a 150 nm thick reflection layer.

The disc was taken out of the vacuum vessel and the reflection layer was spin coated with an photo-curable acrylic resin which was cured with ultraviolet rays, for forming a 10 $\mu$m thick resin layer, thus producing an optical recording medium of the present invention. It was bonded to another similarly produced disc using an adhesive, to prepare a double-sided disc.

A semiconductor laser beam with a wave length of 830 nm is applied to this optical medium, and the whole area of the recording layer of the disk is crystallized for initiallization.

The recorded signals used in this example were of (1, 7) RLL code. The (1, 7) RLL is signals of 2T to 8T in pulse duration, where T is the window margin. Since this example used a linear velocity of 6.2 m/s and the shortest mark length (the length of a 2T mark) of 0.53 $\mu$m, the window margin (T) was 42.5 nsec. For evaluation, an optical head of 0.6 in the numerical aperture of the objective lens and 680 nm in the wavelength of the semiconductor laser beam was used.

The pulse shape of a laser beam is described below concretely.

The shortest mark of 2T is recorded by a pulse train consisting of a recording pulse of T (42.5 nsec) in pulse duration and a pulse of T in pulse duration, lower in laser beam output than the direct erase power and located immediately after the recording pulse (hereinafter called an off pulse).

The second shortest mark of 3T is recorded as described below. It is recorded by a pulse train consisting of a recording pulse of T/2 in pulse duration added after T/2 from the first pulse of the shortest mark of 2T and an off pulse of T in pulse duration and lower in laser beam output than the erase power added immediately after said pulse.

In this way, whenever a recorded mark becomes longer by T, a pulse of T/2 is added and furthermore an off pulse is added immediately after last pulse of these pulses, to form the recorded mark with the intended length. The longest mark of 8T is recorded by a pulse train consisting of 7 recording pulses (the first pulse of T in pulse duration and six subsequent pulses of T/2 in pulse duration and T in period) and an off pulse of T in pulse duration provided immediately after the last pulse of the subsequent pulses.

Respective properties were measured as described below.

The power for applying the off pulse was set at the same level as the read power (1.2 mW). The above pulses were used to overwrite 2T marks (frequency for reproduction 5.9 MHz) 100 times on the groove, using a semiconductor laser beam modulated to a erase power fixed at 4.5 mW and recording power from 6 to 15 mW and a semiconductor laser beam of 1.2 mW in read power was applied, to measure C/N values with a band width of 30 kHz. C/N values of practically sufficient 50 dB or more could be obtained at recording powers of 8 mW or more.

Furthermore, a semiconductor laser beam modulated to a recording power fixed at 9.5 mW and the erase power from 3 to 7 mW was used to overwrite 2T marks 100 times and the portions were irradiated with a semiconductor laser beam modulated as described before, to have 7T marks (1.7 MHz), for one-time overwriting and the erasabilities of 2T marks (the difference between 2T carriers after overwriting 2T marks 100 times and the remaining 2T carriers after overwriting 7T marks once) in this case and jitter values of 7T marks were measured.

The erasabilities were 28 dB or more, 33 dB at the maximum in an erase power range of 3.5 to 5.5 mW. The jitter values of leading and trailing edges of 7T marks were also 4 nsec or less, 2.2 nsec at the minimum in said erase power range.

Since the jitter values of both leading and trailing edges were less than 10% of the window (T=42.5 nsec), they were found to be practically sufficiently small.

EXAMPLE 10

An optical recording medium identical with that of Example 9 except that the thickness of the second dielectric layer was 10 nm and that the thickness of the reflection layer was 100 nm was used. The 8/15 modulation system was used and respective properties were measured as described in Example 9. Since the 8/15 modulation is of (2, 12) RLL, it gives signals of 3T to 13T in pulse duration, where T is the window margin. Since this example adopted a linear velocity of 6.5 m/s and the shortest mark length (3T mark length) of 0.74 $\mu$m, the window margin (T) was 38.0 nsec.

The shortest mark of 3T (frequency for reproduction 4.4 MHz) was recorded by a pulse train consisting of a recording pulse of T/2 in pulse duration added after T/2 from the first pulse of T in pulse duration and an off pulse of T in pulse duration added immediately after it.

As in Example 9, a pulse train, with a recording pulse of T/2 in pulse duration added whenever the recorded mark became longer by T, with an off pulse added immediately after the last pulse of these pulses, was used for forming each recorded mark. The longest mark of 13T (frequency for reproduction 1.0 MHz) was recorded by 12 recording pulses (the first pulse of T in pulse duration and eleven subsequent pulses of T/2 in pulse duration and T in period) and an off pulse of T in pulse duration provided immediately after the last pulse of the subsequent pulses.

The power for applying the off pulse was set at 0 mW.

Respective properties were measured on both the land and the groove.

C/N values were measured as described in Example 9, except that 3T marks were used. For measurement of erasabilities, 3T marks were overwritten 100 times and 13T marks were overwritten once, to measure the erasabilities of 3T marks. Furthermore, the jitter values of 13T marks in this case were measured.

C/N values were practically sufficient 50 dB or more, 57 dB at the maximum at recording powers of 8 mW or more on both the land and the groove. Erasability were 30 dB or more, 36 dB at the maximum at a recording power of 10 mW and erase powers of 3.5 to 5.5 mW on both the land and the groove. The jitters at the leading and trailing edges of 13T marks were also 3.5 nsec or less, 2.5 nsec at the minimum in the same erase power range.

Since the jitter values at both the leading and trailing edges on both the land and the groove were less than 10% of the window margin (T=38.0 nsec), they were found to be practically sufficiently small.

Comparative Example 3

The same optical recording medium as used in Example 9 was used and marks were recorded by the same pulses as in Example 9 except that the off pulse was removed. Respective properties were measured as described in Example 9.

C/N values were as obtained in Example 9.

Erasabilities were 25 dB or more in the same erase power range as in Example 9, but the maximum erasability was 28 dB, being lower than that of Example 9.

Jitter values were as stated below. The jitter values at the leading edges of 7T marks were 4 nsec or less, 2.8 nsec at the minimum in an erase power range from 3.5 to 5.5 mW. However, the jitter values at the trailing edges did not become 4 nsec or less at any of the erase powers and the minimum jitter was only 5.8 nsec.

The jitter values at the trailing edges did not become 13% or less of the window margin at any of the erase powers and found to be unpractical and worse than those of Example 9.

Comparative Example 4

The same optical recording medium as used in Example 9 was used and respective properties were measured as described in Example 9, except that the duration of the off pulse was T/2.

C/N values were as obtained in Example 9.

Erasabilities were 25 dB or more in the same erase power range as in Example 9, but the maximum erasability was 29 dB, being lower than that of Example 9.

Jitter values were as stated below. The jitter values at the leading edges of 7T marks were 4 nsec or less, 2.9 nsec at the minimum in an erase power range from 3.5 to 5.5 mW. The jitter values at the trailing edges were 4 nsec or less, 3.4 nsec at the minimum in a range from 3.0 to 4.0 mW. The erase power range, in which jitter values of 4 nsec or less could be obtained, was 1 mW, being more narrow than that of Example 9.

Comparative Example 5

The same optical recording medium as used in Example 10 was used and marks were recorded by the same pulse trains as those of Example 10, except that the off pulse was removed. Respective properties were measured on both the land and the groove as described in Example 10.

C/N values were as obtained in Example 10.

Erasabilities were 25 dB or more in the same erase power range, but the maximum erasability was 29 dB, being lower than that of Example 10.

Jitter values were as stated below. The jitter values at the leading edges of 13T marks were 3.5 nsec or less and 3.0 nsec at the minimum in an erase power range from 3.5 to 5.5 mW. However, the jitter values at the trailing edges did not become 4 nsec or less at any of the erase powers and the minimum jitter was only 5.0 nsec.

The jitter values at the trailing edges did not become 13% or less of the window margin at any of the erase powers and found to be unpractical and larger than those of Example 10.

EXAMPLE 11

An optical recording medium identical with that of Example 10 except that the thicknesses of the first dielectric layer, the recording layer, the second dielectric layer and the reflection layer were 250 nm, 25 nm, 12 nm and 120 nm, respectively, and the composition of the recording layer was $Pd_{0.1}Ge_{19.0}Sb_{26.0}Te_{54.9}$ was prepared. The modulation system used was 8/16 modulation (FEM plus). It is a modulation having the shortest recording mark of 3T, where T is the window margin. In this example, a linear velocity of 5.8 m/s and T=35.6 nsec were adopted.

The shortest mark of 3T (frequency for reproduction 4.7 MHz) was recorded by a pulse train consisting of a recording pulse of 1.5T in pulse duration (first pulse) and off pulse of 1.5T in pulse duration added immediately after it.

As in Example 9, a pulse train, with a recording pulse of T/2 in pulse duration added whenever the recorded mark became longer by T, with an off pulse added immediately after the last pulse of these pulses, was used for forming each recorded mark. The longest mark of 14T (frequency for reproduction 1.0 MHz) was recorded by 12 recording pulses (the first pulse of 1.5ST in pulse duration and eleven subsequent pulses of T/2 in pulse duration and T in period) and an off pulse of 1.5T in pulse duration provided immediately after the last pulse of the subsequent pulses.

The power for applying the off pulse was set at 0.5 mW.

Respective properties were measured on both the land and the groove.

C/N values were measured as described in Example 10. For measurement of erasability, the recording power was fixed to 11 mW and using semiconductor laser beam modurated 3–6 mW in the erase power, 3T marks were overwritten 100 times and 11T marks were overwritten once, to measure the erasabilities of 3T marks. Furthermore, the jitter values of 11T marks in this case were measured.

C/N values were practically sufficient 50 dB or more, 57 dB at the maximum at recording powers of 8 mW or more on both the land and the groove. Erase rates were 30 dB or more, 36 dB at the maximum at a recording power of 11 mW and erase powers of 3.5 to 5.5 mW on both the land and the groove. The jitters at the leading and trailing edges of 11T marks were also 3.5 nsec or less, 2.0 nsec at the minimum in the same erase power range.

Since the jitter values at both the leading and trailing edges on both the land and the groove were less than 10% of the window margin, they were found to be practically sufficiently small.

EXAMPLE 12

Experimental conditions such as the optical recording medium and the modulation system were identical with that of Example 11. The followings are the recording pulse utilized in this example.

The basic pulse pattern is as follows. The shortest mark of 3T (frequency for reproduction 4.7 MHz) is effected by series of pulses consisting of first pulse T in pulse duration, recording pulse T/2 after T/2 and off pulse 1.5T added immediately after it.

As recording mark becomes longer, recording pulses T/2 in pulse duration each after T/2 are repeated and an off pulse of 1.5T in pulse duration is provided immediately after the last pulse of the subsequent pulses.

In this example, based on the above mentioned recording pulse, the location of the first pulse was made appropriate by the two parameter, namely, the length of the recording mark and the distance between the recording mark and a recording mark just before the recording mark.

For example, when the distance between said recording marks (hereunder called as Tsb) was 3T and the length of the recording mark (hereunder called Tmk) was 3T, the location of the first pulse was put off for 32 nsec. Similarly, the location of the first pulses were put off for, when Tsb was 3T and Tmk was 4T, 26 nsec, when Tsb was 3T and Tmk was more than 5T, 24 nsec, when Tsb was 4T and Tmk was 3T, 28 nsec, when Tsb was 4T and Tmk was 4T, 24 nsec, when Tsb was 4T and Tmk was more than 5T, 24 nsec, when Tsb was more than 5T and Tmk was 3T, 24 nsec, when Tsb was more than 5T and Tmk was 4T, 24 nsec, when both of Tsb and Tmk were more than 5T, 18 nsec.

Using the above mentioned recording pulse, on land and groove, with recording power of 11 mW and erase power of 4.5 mW, random pattern was overwritten 100 times and its total jitter was measured. Off pulse was irradiated at 0.5 mW.

The jitters of the leading and trailing edges of the land were 2.94 nsec and 2.93 nsec, respectively. The jitters of the leading and trailing edges of the grooves were 2.94 nsec and 2.54 nsec, respectively.

Since all the jitter values were less than 10% of the window, they were found to be practically sufficiently small.

As can be seen from the above, by using an optical recording medium of the present invention the following effects can be obtained.

(1) The cross talk in the recording on both the land and the groove can be decreased.
(2) The recording characteristics on both the land and the groove can be arranged to be identical in the recording on both the land and the groove.
(3) The cross erase in the recording on both the land and the groove can be decreased.
(4) The optical recording medium can be easily produced by sputtering.
(5) The jitter in overwriting can be decreased.
(6) Erasability can be enhanced.

We claim:

1. An optical recording medium having lands and grooves, comprising a recording layer, a dielectric layer and a reflecting layer,
    wherein,
        (a) each of said lands and each of said grooves utilizes a phase change between an amorphous phase and a crystalline phase in said recording layer to record and erase data,
        (b) said reflecting layer has a thickness of more than 30 nm and
        (c) said optical recording medium has a mirror portion having a reflectance of:
            (1) more than 15% and no more than 35% when said recording layer is in the crystalline state and
            (2) 10% or less when said recording layer is in the amorphous state.

2. An optical recording medium according to of claim 1, wherein the phase difference between the reflected light of the amorphous phase and the reflected light of the crystalline phase is $2n\pi - \pi/3$ to $2n\pi + \pi/3$, where n is an integer.

3. An optical recording medium according to of claim 1, wherein the phase difference between the reflected light of the amorphous phase and the reflected light of the crystalline phase is $2n\pi + 2\pi/3$ to $2n\pi + 4\pi/3$, where n is an integer.

4. An optical recording medium according to of claim 1, wherein the depth of the groove is $1/7$ to $1/5$ of the wavelength of the reproducing light.

5. An optical recording medium according to of claim 1, which is a laminate consisting of a substrate, first dielectric layer, recording layer, second dielectric layer, and reflection layer in this order, and the refractive indexes and thicknesses of the first and second dielectric layers are in the ranges shown by the following formula (1) and (2), respectively.

Formulae (1)

$$1.5 \leq n1 \leq 2.4$$

$$50 \leq d1 \leq 300$$

Formulae (2)

$$1.5 \leq n2 \leq 2.4$$

$$1 \leq d2 \leq 50$$

Where n1 and n2 are the refractive indexes of the first and second dielectric layers, and d1 and d2 are the thicknesses (nm) of the first and second dielectric layers, respectively.

6. An optical recording medium according to of claim 1, wherein the recording layer contains Sb or Te.

7. An optical recording medium according to claim 6, wherein the recording layer is comprises a ternary alloy of Ge, Te and Sb, or comprises an alloy of the three elements of Ge, Te and Sb, plus at least one metal selected from Pd, Nb, Pt, Au, Ag, Ni and Co, the thickness of the recording layer being 10 nm or more and 40 nm or less.

8. An optical recording medium according to claim 6, wherein the composition of the alloy of the recording layer is expressed by Formula (3) given below:

Formula (3)

$$M_z(Sb_xTe_{1-x})_{1-y-z}(Ge_{0.5}Te_{0.5})_y$$

$$0.4 \leq x \leq 0.6$$

$$0.3 \leq y \leq 0.5$$

$$0 \leq z \leq 0.05$$

where x, y and z denote respective molar ratios and M denotes at least one metal selected from Pd, Nb, Pt, Au, Ag, Ni and Co;
and the reflection layer consists of an Al alloy.

9. An optical recording medium according to of claim 1, wherein the recording layer contains at least In or Se.

10. An optical recording medium according to of claim 1, wherein the track pitch, width of a flat portion of the land and the width of a flat portion of the groove bottom are expressed by the following formulae:

Formula 4

$$Tp = a \cdot \lambda / NA$$

$$1 \leq a \leq 1.5$$

$$Tg = Tp \cdot b$$

$$0.2 \leq b \leq 0.6$$

$$T_L = Tp \cdot c$$

$$0.2 \leq c \leq 0.6$$

where Tp is the track pitch ($\mu$m): NA is the numerical aperture of the lens; $\lambda$ is the reproducing wavelength ($\mu$m); Tg is the width of the flat portion of the groove ($\mu$m); and $T_L$ is the width of the flat portion of the land ($\mu$m).

11. An optical recording medium according to of claim 1, wherein the land and the groove consist substantially of a flat portion and slope portions, the widths of the slope portions being from 0.05 $\mu$m to 0.2 $\mu$m.

12. An optical recording medium according to of claim 1, wherein the widths of the marks recorded on the land are at least half the width of the flat portion of the land, or the widths of the marks recorded on the groove are at least half the width of the flat portion of the groove.

13. An optical recording medium according to of claim 1, wherein the thickness of the substrate is expressed by Formula (5) which is given below:

$$0.01 \leq (NA)^3 \cdot d \leq 0.20 \qquad (5)$$

where NA denotes the numerical aperture of the lens and d denotes the thickness (mm) of the substrate.

14. An optical recording medium according to of claim 1, wherein the dielectric layer contains at least ZnS, SiO$_2$ and carbon.

15. An optical recording medium having lands and grooves, comprising a recording layer having a photo-absorbance and a reflecting layer having a thickness of more than 30 nm,
wherein,
 (a) each of said lands and each of said grooves utilizes a phase change between an amorphous phase and a crystalline phase in said recording layer to record and erase data,
 (b) each of said grooves has a depth corresponding to an optical path length of 1/7 to 1/5 of the wavelength of the reproducing light, and
 (c) the photo-absorbance of said recording layer in the amorphous phase and the photo-absorbance of said recording layer in the crystalline phase satisfy the following formula:

$$Aa - Ac \leq 10$$

where Aa is the photo-absorbance (%) of said recording layer in the amorphous phase, and Ac is the photo-absorbance (%) of said recording layer in the crystalline phase.

16. An optical recording medium according to claim 15, wherein a mirror portion thereof has a reflectance, when in the crystalline state, of more than 15% and no more than 35%.

17. An optical recording medium according to claim 15, wherein a mirror portion thereof has a reflectance, when in the amorphous state, of 10% or less.

18. An optical recording medium according to any one of claims 16 or 17, wherein the phase difference between the reflected light of the amorphous phase and the reflected light of the crystalline phase is 2 n $\pi - \pi/3$ to 2 n $\pi + \pi/3$, where n is an integer.

19. An optical recording medium according to any one of claims 16 or 17, wherein the phase difference between the reflected light of the amorphous phase and the reflected light of the crystalline phase is 2 n $\pi + 2 \pi/3$ to 2 n $\pi + 4 \pi/3$, where n is an integer.

20. An optical recording medium according to any one of claims 16 or 17, wherein the recording layer contains at least Sb or Te.

21. An optical recording medium according to any one of claims 16 or 17, wherein the recording layer is comprises a ternary alloy of Ge, Te and Sb, or comprises an alloy of the three elements of Ge, Te and Sb, plus at least one metal selected from Pd, Nb, Pt, Au, Ag, Ni and Co, the thickness of the recording layer being 10 nm or more and 40 nm or less.

22. An optical recording medium according to any one of claims 16 or 17, wherein the composition of the alloy of the recording layer is expressed by Formula (7) given below.

Formula (7)

$$M_z(Sb_xTe_{1-x})_{1-y-z}(Ge_{0.5}Te_{0.5})_y$$

$$0.4 \leq x \leq 0.6$$

$$0.3 \leq y \leq 0.5$$

$$0 \leq z \leq 0.05$$

where x, y and z denote respective molar ratios, and M denotes at least one metal selected from Pd, Nb, Pt, Au, Ag, Ni and Co.

23. An optical recording medium according to any one of claims 16 or 17, wherein the recording layer contains at least In or Se.

24. An optical recording medium according to any one of claims 16 or 17, wherein the optical recording medium has at least a first dielectric layer, recording layer and photo-absorbable layer.

25. An optical recording medium according to claim 24, wherein the photo-absorbable layer is made of at least one metal selected from Ti, Zr, Hf, Cr, Ta, Mo, Mn, W, Nb, Rh, Ni, Fe, Y, V, Co, Cu, Zn, Ru, Pd, Lanthanides and Te.

26. An optical recording medium according to claim 24, wherein the photo-absorbable layer is made of an alloy consisting of at least one metal and Si and/or Ge.

27. An optical recording medium according to claims 16 or 17, wherein the optical recording medium is a laminate of at least a substrate, first dielectric layer, recording layer, second dielectric layer, photo-absorbable layer and reflection layer in this order, and the thickness of the reflection layer is 10 nm or more.

28. An optical recording medium according to claims 16 or 17, wherein the optical recording medium is a laminate of at least a substrate, first dielectric layer, recording layer, second dielectric layer and a reflection layer in this order, or a laminate of at least a substrate, first dielectric layer, recording layer, second dielectric layer, photo-absorbable layer and reflection layer in this order and the refractive indexes and thicknesses of the first and second dielectric layers are in the ranges shown by the following formulae (1) and (2), respectively.

Formulae (1)

$$1.5 \leq n1 \leq 2.4$$

$$50 \leq d1 \leq 300$$

Formulae (2)

$$1.5 \leq n2 \leq 2.4$$

$$1 \leq d2 \leq 50$$

where n1 and n2 are the refractive indexes of the first and second dielectric layers, and d1 and d2 are the thicknesses (nm) of the first and second dielectric layers, respectively.

29. An optical recording medium according to any one of claims 1 and 15, wherein the recording layer contains nitrogen.

30. An optical recording medium according to claim 29, wherein the nitrogen atom concentration of the recording layer is 0.1 atom % to 10 atom %.

31. An optical recording medium according to claim 30, wherein the nitrogen atom concentration of the recording layer is 1 atom % to 3.5 atom %.

* * * * *